(12) United States Patent
Johnstone et al.

(10) Patent No.: US 9,307,461 B2
(45) Date of Patent: Apr. 5, 2016

(54) FEMTOCELL NETWORK (75) Inventors: Justin Gordon Johnstone, Bath (GB); James Briers, Calne (GB)

(73) Assignee: Ubiquisys Limited, Swindon (GB)

(*) Notice: Subject to any disclaimer, the term of this patent is extended or adjusted under 35 U.S.C. 154(b) by 154 days.

(21) Appl. No.: 13/980,706

(22) PCT Filed: Jan. 20, 2012

(86) PCT No.: PCT/GB2012/050127
§ 371 (c)(1),
(2), (4) Date: Sep. 19, 2013

(87) PCT Pub. No.: WO2012/098411
PCT Pub. Date: Jul. 26, 2012

(65) Prior Publication Data
US 2014/0018081 A1     Jan. 16, 2014

(30) Foreign Application Priority Data

Jan. 21, 2011  (GB) .................................. 1100993.3

(51) Int. Cl.
*H04W 36/00* (2009.01)
*H04W 8/26* (2009.01)
*H04W 88/08* (2009.01)

(52) U.S. Cl.
CPC ...... *H04W 36/0083* (2013.01); *H04W 36/0061* (2013.01); *H04W 8/26* (2013.01); *H04W 88/08* (2013.01)

(58) Field of Classification Search
CPC .... H04W 36/04; H04W 16/32; H04W 84/045

USPC ........................ 455/444, 436, 442, 435.1, 561
See application file for complete search history.

(56) References Cited

U.S. PATENT DOCUMENTS

| | | | |
|---|---|---|---|
| 2005/0101326 A1* | 5/2005 | Kang et al. | 455/436 |
| 2006/0092883 A1 | 5/2006 | Lee et al. | |
| 2009/0232096 A1 | 9/2009 | Taniuchi | |

(Continued)

FOREIGN PATENT DOCUMENTS

| | | |
|---|---|---|
| EP | 2471305 A1 | 7/2012 |
| WO | WO2008/153847 A1 | 12/2008 |

(Continued)

OTHER PUBLICATIONS

PCT International Search Report and Written Opinion dated Mar. 30, 2012 for PCT Application No. PCT/GB2012/050127.

(Continued)

*Primary Examiner* — Nghi H Ly
(74) *Attorney, Agent, or Firm* — Weaver Austin Villeneuve & Sampson LLP (57) ABSTRACT

A femtocell base station in a telecommunications network identifies, for each user device served by the base station, which other base stations in the network that user device is authorized to access. The base station also determines a group identity for each of a plurality of possible neighbor cell base stations in the network. Based on this information, the base station identifies at least one possible handover target cell base station for each user device served by the base station, based on the identified other base stations in the network that user device is authorized to access; and based on the identified group identity for each of a plurality of possible neighbor cell base stations in the network.

18 Claims, 6 Drawing Sheets

(56) References Cited

U.S. PATENT DOCUMENTS

| | | |
|---|---|---|
| 2010/0113031 A1 | 5/2010 | Kim et al. |
| 2010/0151858 A1 | 6/2010 | Brisebois et al. |
| 2010/0167730 A1 | 7/2010 | Shin |
| 2010/0190496 A1 | 7/2010 | Chinnathambi |

FOREIGN PATENT DOCUMENTS

| | | |
|---|---|---|
| WO | WO2009/058108 A1 | 5/2009 |
| WO | WO2010/050755 A2 | 5/2010 |
| WO | WO2010/052686 A2 | 5/2010 |
| WO | WO2010/121127 A1 | 10/2010 |
| WO | WO 2011/025709 A1 | 3/2011 |
| WO | WO 2012/098411 A1 | 7/2012 |

OTHER PUBLICATIONS

UK Search Report dated Jun. 1, 2011 for UK Application No. GB1100993.3.

GB Second Examination Report dated Jan. 6, 2015 for GB Application No. 1100993.3.

* cited by examiner

| Served UE | 30 | 32 | 34 |
|---|---|---|---|
| Groups on which served user is authorised | 60,64 | 60,64,62 | 60,64,62,66 |
| List of Allowed neighbours | 14,16,22 | 14,16,22,18,20 | 14,16,22,18,20,26 |

FEMTOCELL NETWORK

This invention relates to a telecommunications network, and in particular to a network that includes femtocell basestations, also referred to as Home NodeBs, or as Home eNodeBs.

It is known to provide femtocell basestations to increase the capacity of a cellular communications network, with each femtocell basestation having a relatively small coverage area. Femtocell basestations can be configured as "Closed access", in which case they provide exclusive service to a restricted number of dedicated (pre-provisioned) users, or they can be configured as "Open access" or "Public access", in which case they do not perform any local access control or rejection of users.

Standards defining the required functions of femtocell basestations are set by the 3rd Generation Partnership Project (3GPP). Before 3GPP Release 8, user equipment devices (UEs) are typically unable to ascertain which femtocells they will or will not be granted service on. Therefore pre-Release 8 UEs will typically attempt to register for service on any otherwise suitable femtocell. From 3GPP Release 8 onwards, the concept of a Closed Subscriber Group (CSG) is introduced whereby:

a) 3GPP Release 8 (or later) compliant femtocells are allocated a single CSG identity by the operator and the femtocells broadcast this information for UEs to read;
b) 3GPP Release 8 (or later) UEs are configured with an operator authorised list of one or more CSG identities which the UE is authorised to access; and
c) 3GPP Release 8 (or later) UEs only request service on 3GPP release 8 (or later) femtocells if the detected CSG-Identity of the femtocell matches an entry in the UE's list of authorised CSGs.

The 3GPP Release 8 specifications (for example sections 22.220, 25.467, 25.468 and 25.469) cover CSG. The 3GPP Release 9 specifications (for example sections 4.11 and 4.12) cover inter-femtocell handover and mobility. The 3GPP Release 10 work items (for example section 4.1 in v0.0.7) are studying enterprise femtocell, including mobility.

However, it remains possible for a serving femtocell to initiate a handover of a UE to a target femtocell on which that UE is not authorised. The 3GPP standards then assume that the handover procedures include an access control check by the target femtocell which can reject the handover request for specific users when the user is not authorised on that target. When a target femtocell rejects the user handover request on the basis that the specific user is not authorised on the target, the source femtocell's efforts to prepare for and perform the handover procedure to the target are wasted, and thus are a source of inefficiency in the network.

It would therefore be advantageous to be able to manage a mobility procedure in order to avoid such wasted efforts.

According to a first aspect of the present invention, there is provided a method of operation of a base station in a telecommunications network, the method comprising, in the base station:
for a user device served by the base station, making a positive determination that the user device is authorised to access an alternative base station; and
instructing the user device to handover to the alternative base station handover only following said positive determination.

According to a second aspect of the present invention, there is provided a method of operation of a base station in a telecommunications network, the method comprising, in the base station:
for a user device served by the base station, identifying which other groups of base stations in the network that user device is authorised to access;
identifying a group identity for each of a plurality of possible neighbour cell base stations in the network; and
identifying at least one possible handover target cell base station for the user device served by the base station, based on the identified other groups of base stations in the network that that user device is authorised to access; and based on the identified group identity for each of a plurality of possible neighbour cell base stations in the network.

According to a third aspect of the present invention, there is provided a method of operation of a base station in a telecommunications network, the method comprising, in the base station:
for a user device served by the base station, identifying at least one possible handover target cell base station;
sending an access control query to the possible handover target cell base station;
receiving a response to the access control query from the possible handover target cell base station, said response indicating whether that user device is authorised to access the possible handover target cell base station; and
based on said response, determining whether to instruct the user device to handover to the possible handover target cell base station.

According to a fourth aspect of the present invention, there is provided a method of operation of a base station in a telecommunications network, the method comprising, in the base station:
for a user device served by the base station, sending an access control query to one base station in each of a plurality of groups of base stations;
receiving responses to the access control queries from the base stations in the plurality of groups of base stations, said responses indicating whether that user device is authorised to access the respective base station; and
based on said responses, identifying possible handover target cell base stations as the base stations from which positive responses to the access control queries were received, and other base stations sharing a group identity with one of the base stations from which a positive response to the access control query was received.

According to a fifth aspect of the present invention, there is provided a computer program product for causing a device to operate in accordance with a method of the invention.

According to a sixth aspect of the present invention, there is provided a base station configured to operate in accordance with a method of the invention.

This has the advantage that, since many possible handovers that would fail can be excluded from the procedure, handovers can be performed more quickly, and with a reduced possibility of failure or of dropping the call.

For a better understanding of the present invention, and to show how it may be put into effect, reference will now be made, by way of example, to the accompanying drawings, in which:—

Figure 1:
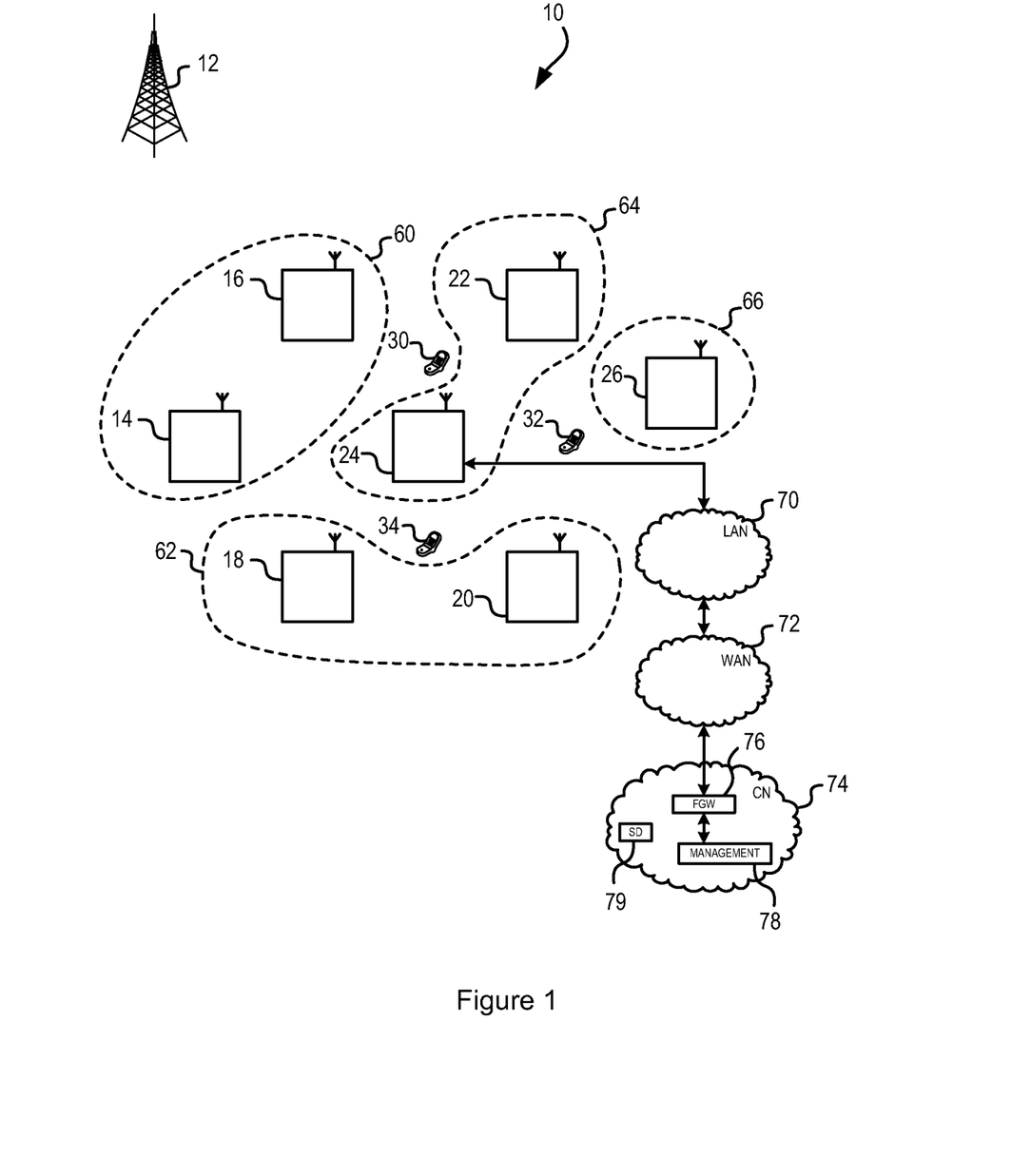
FIG. 1 is a schematic illustration of a cellular mobile communications network operating in accordance with an aspect of the present invention.

FIG. 1 shows a part of a cellular mobile communications network 10. It will be understood that, in a typical situation, there might be multiple cellular networks covering a single geographical area, each operated by a respective mobile network operator. The following description refers only to the operation of one of these networks. By way of an illustrative example, this part of the network 10 might cover an area such as a shopping mall, university campus, or the like, although the invention is not limited to use in any particular situation. The network 10 might for example be a network operating in accordance with GSM, 3GPP/UMTS or 4G/LTE radio access technologies, but it could equally use other radio access technologies such as DECT, WiFi, or WiMax.

The illustrated area is within the coverage area of at least one macrocell basestation 12, which might typically have a coverage area with a radius of several kilometers. Also located within the illustrated area are several femtocell basestations 14, 16, 18, 20, 22, 24, 26, each of which also acts as a cellular basestation within the network 10.

As is known, femtocell basestations can be configured as "Closed access", in which case they provide exclusive service to a restricted number of dedicated (pre-provisioned) users. In that case, local access control procedures in the femtocell basestation can restrict service to only these users that are provisioned (authorised) on that femtocell basestation. The list of authorised users is referred to as the "Access Control List" (ACL) or the "white list". A closed access femtocell basestation will reject a request for access from any user not in the ACL. As an alternative, "Closed access" can be achieved by application of Closed Subscriber Groups (CSGs).

Alternatively, femtocell basestations can be configured as "Open access" or "Public access", in which case they do not perform local access control or rejection of users based on an ACL or a CSG. Rather, they refer all user access requests to the mobile core network, and respond to the access request according to the decision indicated by the core network. This is also how access control is applied in most macrocell basestations.

The femtocell basestations 14, 16, 18, 20, 22, 24, 26 deployed over the area illustrated in FIG. 1 are defined as an association.

The femtocell basestations 14, 16, 18, 20, 22, 24, 26 of the association may form an enterprise group, under the ownership and/or operational control of a single corporate user, for example.

In a typical deployment, there will be multiple distinct associations within the operator's network and each association is treated as independent from other associations. As described in more detail below, seamless handover of users between femtocells in the same association is required, but handover between femtocells in different associations is not required. An association contains more than one femtocell, but any femtocell can only be allocated to one association.

In this illustrated embodiment of the invention, the association of femtocell basestations 14, 16, 18, 20, 22, 24, 26 is subdivided into multiple groups, and the multiple groups may provide overlapping service in the same coverage area. In general, while an association contains more than one femtocell, an association may consist of one or more groups, and a group may consist of one or more femtocells. Any femtocell can only be allocated to one group.

In this illustrated situation, each entire group is configured as open access or closed access, as these are described above. The association may consist of both open access groups and closed access groups. However, all femtocells in a group share the same access control mode. Thus, in the case of closed access groups, all femtocells in that group share the same ACL and/or CSG. When the association includes multiple closed access groups, each of these groups may have a distinct ACL and/or CSG.

FIG. 1 also shows three user equipment devices (UEs) 30, 32, 34, which are active on the femtocell basestation 24, as will be described in more detail below.

FIG. 1 also shows, for the femtocell basestation 24, a connection to a local area network (LAN) 70, which in turn allows connection by means of a suitable server in the LAN 70 to a public wide area network (WAN) 72 such as the internet. The femtocell basestation 24 can thus connect to the core network (CN) 74 of the mobile communications network 10, which includes a femtocell gateway (FGW) 76 and a management node 78. It will be appreciated that the other femtocell basestations shown in FIG. 1 also have similar connections over a wide area network into the core network 74, and may also be connected to the same LAN 70.

Figure 2:
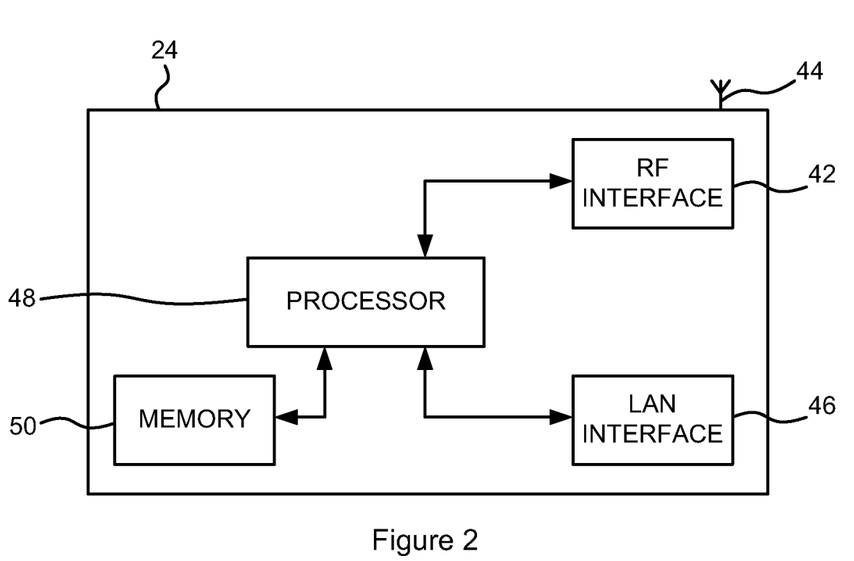
FIG. 2 is a schematic illustration of a femtocell access point in accordance with an aspect of the present invention.

FIG. 2 shows in more detail the functional organisation of the femtocell basestation 24 by way of example, it being understood that each of the femtocell basestations 14, 16, 18, 20, 22, 24, 26 can be substantially similar.

Thus, the femtocell basestation 24 has a radio frequency (RF) interface 42, for communicating with the respective UEs over the air interface via an antenna 44, in accordance with the relevant air interface standard. The femtocell basestation 24 also has a network interface 46, for communicating with other networked devices. Specifically, the network interface 46 allows the connection into the core network 74 of the mobile communications network 10, for example over the public wide area network (WAN) 72. In this illustrated embodiment, the network interface 46 is a local area network (LAN) interface 46, allowing connection over the public wide area network 72 by means of a suitable server in the LAN 70. Some or all of the other femtocell basestations 14, 16, 18, 20, 22, 26 can be connected to the same LAN 70. Regardless of this, the femtocell basestations 14, 16, 18, 20, 22, 24, 26 can communicate with each other over the public wide area network 72.

The operation of the femtocell basestation 24 is under the control of software running on a processor 48, having access to a memory 50. Thus, the software running on the processor 48 causes the femtocell basestation 24 to carry out the procedures described in more detail below.

The invention will now be described in more detail with reference to the exemplary deployment shown in FIG. 1, in which the femtocell basestations 14, 16 form a first group 60, the femtocell basestations 18, 20 form a second group 62, the femtocell basestations 22, 24 form a third group 64, and the femtocell basestation 26 forms a fourth group 66.

In this illustrative situation, the first group 60, and the third group 64, are open access groups, while the second group 62, and the fourth group 66, are closed access groups.

Figure 3:
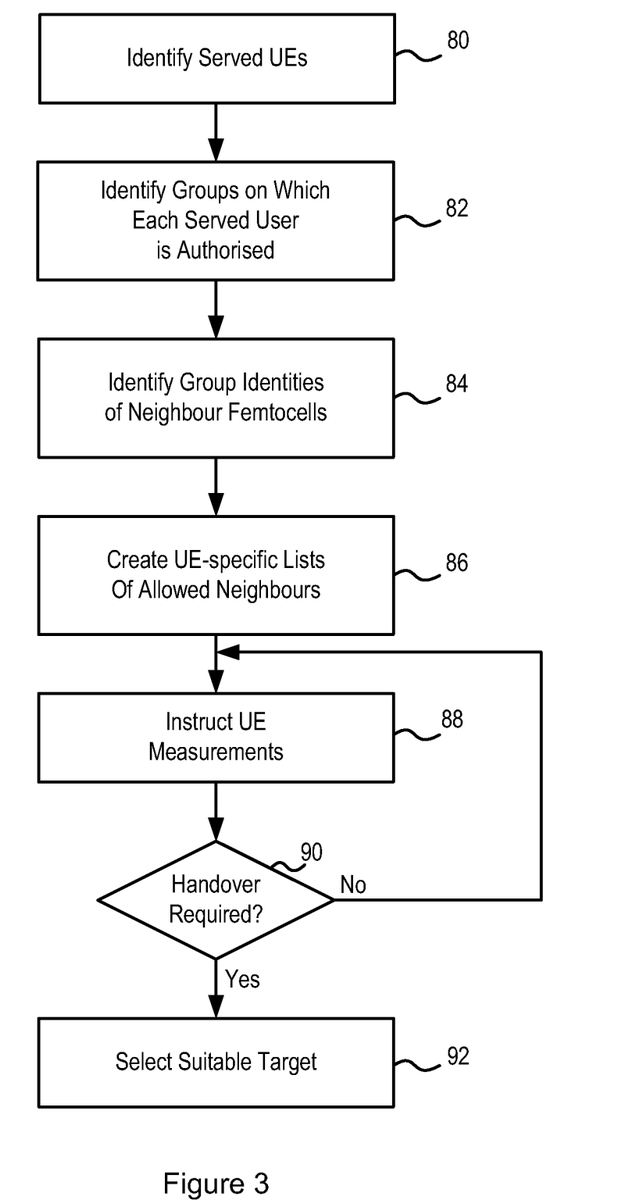
FIG. 3 is a flow chart, illustrating a first method performed in a femtocell access point in accordance with an aspect of the present invention.

FIG. 3 is a flow chart, illustrating a procedure in accordance with an aspect of the invention. This procedure can be carried out when the femtocell basestation 24 is started up, or at periodic intervals thereafter.

In step 80 of the procedure shown in FIG. 3, the femtocell basestation 24 identifies the UEs that it is serving at that time. As an example, the femtocell basestation 24 might identify every UE that is on its whitelist, or ACL. Alternatively, the femtocell basestation 24 might identify every authorised UE that is within its coverage area, whether it is in call, or is simply active on that femtocell basestation without being in a call at that time. In this illustrative situation, the femtocell basestation 24 identifies that it is serving the UEs 30, 32, 34. As is known, users may be authorised on some groups of femtocell basestations but not others, and the groups on which a user is authorised will typically differ from one user to another. While a femtocell basestation that is part of a closed femtocell group will be aware of which users are authorised on that group itself (by virtue of the configured ACL) the femtocells in that group will not, without taking further steps, be aware of which other groups any of these users might be authorised on.

Figure 4:
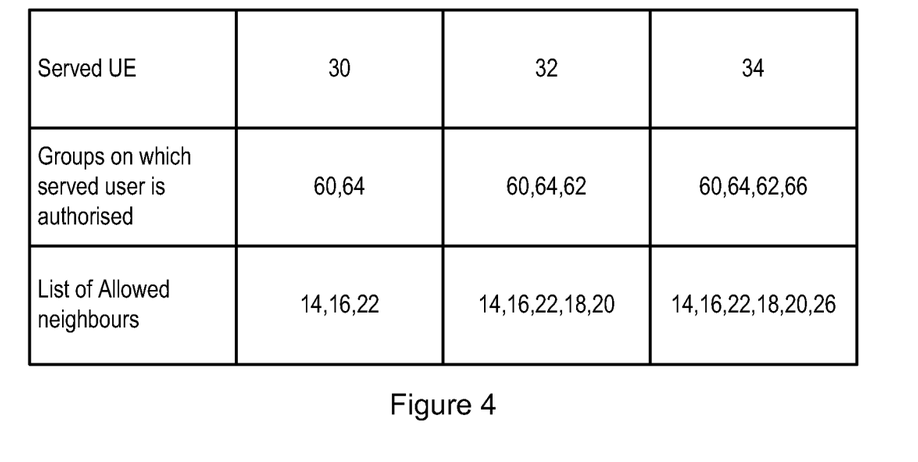
FIG. 4 illustrates information stored in the femtocell access point of FIG. 2 in accordance with an aspect of the present invention.

FIG. 4 illustrates the information stored in the memory 50 of the femtocell basestation 24 in response to different stages in the process of FIG. 3. Thus, the first row of the table in FIG. 4 shows that the femtocell basestation 24 has identified that it is serving the UEs 30, 32, 34.

In step 82, the femtocell basestation 24 identifies, for each of the UEs that it is serving, the groups of femtocell basestations on which that UE is authorised.

In this case, as mentioned above, the first group 60, and the third group 64, are open access groups, and so FIG. 4 shows that each of the UEs 30, 32, 34 is authorised on both of those groups. Further, in this case, the UE 30 is not authorised on either of the closed access groups 62, 66, the UE 32 is additionally authorised on only the closed access group 62, and the UE 34 is authorised on both of the closed access groups 62, 66.

In step 84, the femtocell basestation 24 determines the group identities of the neighbouring femtocells in the association.

In step 86, the femtocell basestation 24 combines the information obtained in steps 82 and 84 to create, for each UE, a list of allowed neighbours for that specific UE. These lists need to be dynamically updated. For example, when there is any change to the list of groups on which any served UE might be authorised, or to the ACL of any femtocell or group, this can be notified by the management system, and the lists can be updated in real time. Similarly, if the procedure is performed only for UEs that are in the coverage area of the femtocell basestation 24, it can be performed whenever a new UE enters the femtocell coverage, regardless of whether it is in call or not.

Thus, in this illustrated example, as shown in FIG. 4, the UE 30 is able to access only the femtocells in the open access groups, namely the femtocells 14, 16 and 22. The UE 32 is additionally able to access the femtocells in the group 62, and so in total is able to access the femtocells 14, 16, 18, 20 and 22. The UE 34 is able to access all of the femtocells in all of the groups in the association, and so in total is able to access the femtocells 14, 16, 18, 20, 22 and 26.

Having created the user-specific lists of allowed neighbours, in step 88 the femtocell basestation 24 instructs any UE that is in a call to make signal strength or quality measurements in preparation for a possible handover procedure. The instruction may also request the UE to provide periodic reports. Rather than broadcasting a common neighbour list that can be read by all served UEs, the femtocell basestation 24 instructs the UE to perform those measurements on the specific subset of neighbour femtocells that belong only to groups to which that specific UE is authorised. Thus, the UE is instructed to make measurements on these neighbours and report these measurements back to the femtocell basestation 24. At the same time, the UE will typically also be instructed to make measurements on at least one macrocell neighbour. The procedure for selecting possible handover targets from amongst the neighbouring macrocells is conventional, and is not described further herein.

Based on the measurements reported by one of those UEs, the femtocell basestation 24 determines in step 90 whether that UE can be better served by one of the neighbour femtocells. If so, in step 92 the femtocell basestation 24 initiates a handover from itself, acting as a source femtocell, to a selected neighbour femtocell within the association, termed the "target femtocell". Thus, the femtocell basestation 24 will only select a target femtocell neighbour that belongs to a group to which that specific UE is authorised. If it is determined in step 90 that a handover is not required at that time, the process may return to step 88 to request further measurement reports. If periodic measurement reports were requested, the process may hold at step 90 while subsequent reports are assessed.

If the target femtocell is a closed access femtocell, it will perform access control, based on its ACL. However, as the femtocell basestation 24 has proactively taken steps to inhibit attempts to handover a UE to target femtocells where that specific user would fail access control checks because it is not authorised, the probability of a failed handover attempt should be greatly reduced.

As described above, in step 82, the source femtocell acquires awareness, for each user it is serving, of other femtocell groups that the user is authorised to access.

Typically each closed access femtocell is configured with its own ACL by the femtocell management system as part of a routine provisioning process, and whenever updates are made the management system updates the ACL on that femtocell. Therefore, unless further steps are taken, the femtocell would only know which users are on its own ACL, but would have no knowledge of either: which other femtocell groups each of the users are authorised to access, or the contents of the ACLs of other groups in the association.

The femtocell can obtain this information in different ways.

As a first possibility, the information can be derived by the femtocell management system 78. The femtocell management system 78 in the core network 74 has access to the entire femtocell database. The management system 78 is therefore able to filter all femtocells that belong to the same femtocell association (e.g. based on a key field such as an "association identity" generally or more specifically an "enterprise identity". The management system can therefore compile the ACL for each group within the association, and send to each femtocell in that association the list of all groups within that femtocell association, and the ACL of each group within that femtocell association.

Figure 5:
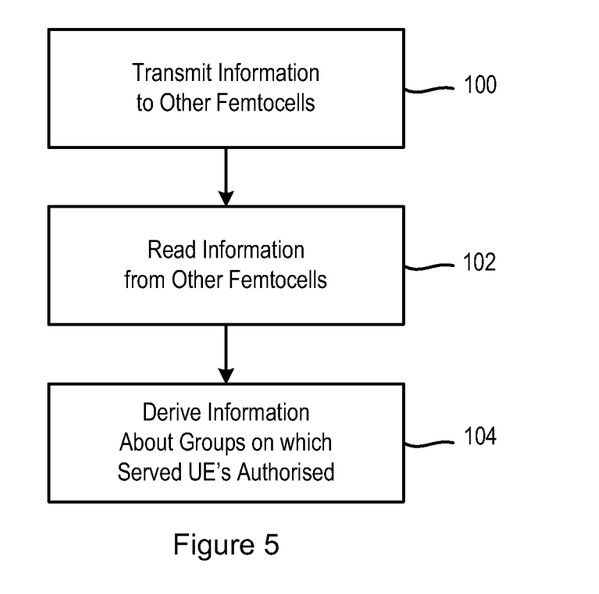
FIG. 5 is a flow chart, illustrating in more detail a part of the method of FIG. 3.

As a second possibility, illustrated in FIG. 5, the information can be derived by the femtocell by inter-femtocell communications. Thus, in step 100, each femtocell transmits information through a direct femtocell-femtocell "side channel" that is supported across all femtocells within the same femtocell association. The "side channel" can be any communications path between two femtocells. The routing of the side channel can be direct, within a local area network, or indirect, over a remote network system. The information transmitted includes the femtocell's group identity, and its entire ACL. The femtocell also reads in step 102 the information transmitted by the other femtocells. This allows the femtocell in step 104 to identify the groups on which each of its served users is authorised.

Figure 6:
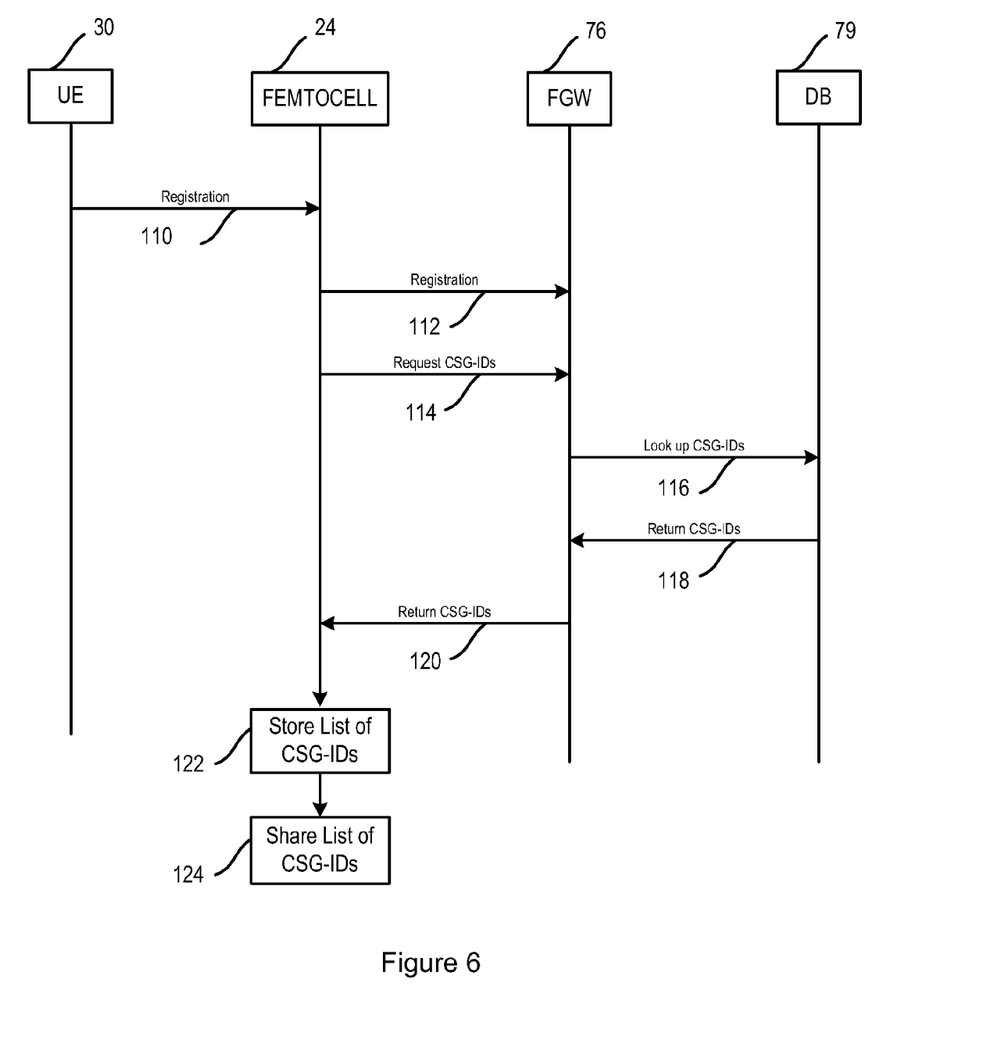
FIG. 6 is a flow chart, illustrating in more detail a further part of the method of FIG. 3.

As a third possibility, illustrated in FIG. 6, the information can be derived by the femtocell by means of a query to the femtocell gateway 76. The femtocell gateway 76 may typically have (indirect) access to a subscriber database (SD) 79 within the core network 74, containing for each UE the list of group identities (for example CSG-IDs) for which that UE is authorised. When an authorised UE (for example the UE 30) registers on a femtocell (for example the femtocell basestation 24), as shown in step 110 of FIG. 6, the femtocell will register that user on the femtocell gateway 76 as shown in step 112.

Further, in step 114, the femtocell requests the list of that specific UE's authorised CSG-IDs, i.e. the groups on which that UE is authorised, from the gateway. Although shown here as separate steps, the registration request 112 and the request for the list of authorised CSG-IDs can be combined in a single message.

In step 116 the gateway 76 looks up the list of that specific UE's authorised CSG-IDs from the subscriber database 79. In step 118, the subscriber database 79 returns the list of that specific UE's authorised CSG-IDs to the gateway 76, and in step 120 the gateway 76 returns the list of that specific UE's authorised CSG-IDs to the femtocell 24. This can be included in a message responding to the registration request 112.

In step 122, the femtocell 24 then stores this list for all UEs that it is serving. Further, in step 124 the femtocell shares this list with all other femtocells in the same group or association. There are efficiency tradeoffs to consider in determining when, and how widely, to share this list within the association. As one example, the sharing in step 124 might be only within the same group at the time when the UE registration takes place, but might subsequently be shared from one femtocell in the original group to another group at a time point when the UE is handed out to a femtocell in that other group.

As a fourth possibility, the information obtained by the femtocell basestation in step 82 can be derived by a femtocell query to the UE. The UE's list of authorised CSG-IDs, i.e. the groups on which that UE is authorised, is held within the UE's (U)SIM card. Typically this list is updated by the operator's core network 74 using 3GPP standardised signalling procedures with over the air transactions to the UE. The femtocell basestation can perform similar standardised over the air procedures with the UE to request and obtain the CSG-ID list from the UE's (U)SIM.

As described above, in step 84, the source femtocell acquires awareness of the respective group identities of all of its neighbour femtocells.

As mentioned above, there is a procedure for assessing possible femtocell-to-macrocell handovers being performed in parallel to the procedure for assessing inter-femtocell handovers. For inter-femtocell handovers, femtocells need to determine which neighbour femtocells are potentially valid neighbours for handout. As discussed above, these potentially valid neighbours might include femtocells from closed access groups, and thus it is possible that not every UE served by the femtocell will be authorised on all of these neighbours. Thus, this list is not specific to any served UE.

The femtocell obtains the list of allowed neighbours through already standardised techniques. For example, the femtocell can detect downlink transmissions of all nearby basestations (both macrocell and femtocell) and decode their broadcast system information, including various identities of these cells. The femtocell can then autonomously filter this list of detected neighbours. For example, the femtocell can disregard detected neighbours that do not belong to its Public Land Mobile Network (PLMN). The femtocell can also detect the cell identities such as the cell-IDs transmitted by the detected neighbours, and can determine which of these cell-IDs relate to femtocells that are within its association. As an alternative, the femtocell can report the list of detected neighbours to the femtocell management system, which responds back to the femtocell with the allowed list.

Some of the neighbours in the list of allowed neighbours might broadcast their group affiliation (e.g. CSG-ID). However, where an allowed neighbour does not broadcast its group affiliation, this may be communicated directly between femtocells using, for example, a direct femtocell-femtocell "side channel" as described above, supported across all femtocells in the same femtocell association. If the group-ID is sent along with some of the same information received in the broadcast system information from all neighbours, this allows the correct group-ID to be mapped to each femtocell neighbour.

Thus, the femtocell can gain awareness of the group identity (e.g. CSG-ID) for each of its allowed neighbours.

As described above, this information can be combined with the information concerning the groups to which the served UEs belong, in order to create a respective list for each UE, indicating the neighbour femtocells that are allowed targets for that UE.

Figure 7:
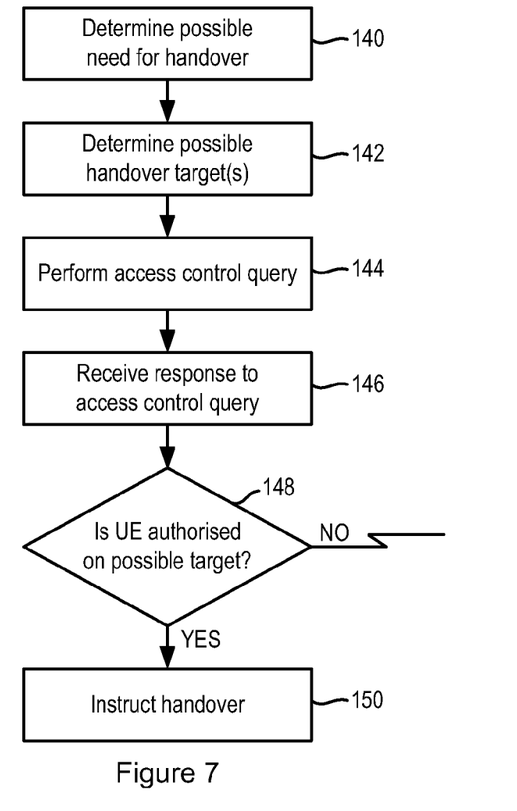
FIG. 7 is a flow chart, illustrating a second method performed in a femtocell access point in accordance with an aspect of the present invention.

FIG. 7 shows a further process for selecting suitable handover targets for a particular UE.

In the process described above, the femtocell obtains information that effectively allows it to extend its ACL, or whitelist, obtaining additional information about each of the UEs that is authorised on that femtocell. In the process shown in FIG. 7, the femtocell attempts to obtain the relevant information dynamically, as required.

The process assumes that a UE is in call on the femtocell basestation. At step 140, the femtocell basestation determines that a handover might be required, and at step 142 the femtocell basestation determines one or more possible targets for the handover, based on measurements of signal quality and/or signal strength between the UE and the available femtocell basestations.

Rather than simply instructing the UE to handover to the target, or one of the possible targets, in step 144 the femtocell performs an access control query to the possible target. That is, the femtocell sends a message to the possible target basestation, asking to be informed whether or not the UE is allowed to access that basestation.

In step 146, the femtocell basestation receives a response to the access control query from the possible target. This response indicates whether the UE is authorised to access the possible target.

In step 148, the femtocell determines from the response to the access control query whether the UE is authorised to access the possible target. If so, the process passes to step 150, and the femtocell instructs the UE to attempt handover to that target.

Thus, the femtocell is able to avoid sending handover instructions that would force the UE to attempt to handover to a femtocell on which it is not authorised.

Where there are multiple possible targets, the access control queries can be sent in parallel or in series. That is, access control queries in step 144 can be sent at the same time to each of the possible targets. In that case, the responses from each possible target will be received in step 146, and in step 148 the femtocell can determine whether the UE is authorised to access the most preferred target. If it is not authorised, step 148 can be repeated, and the femtocell can determine whether the UE is authorised to access the next most preferred target, and so on.

Alternatively, an access control query can be sent in step 144 to the most preferred of the possible targets. In step 148 the femtocell can determine whether the UE is authorised to access that most preferred target. If it is not authorised, step 144 can be repeated, and the femtocell can send an access control query to the next most preferred target, and so on.

If the UE is not authorised on the handover target (or on any of the possible handover targets if there is more than one possible target), this specific handover attempt is aborted. The call may drop if radio conditions worsen, or the may call continue if conditions improve. The femtocell may re-attempt the whole handout process (including applying the group access control checks) a short time later if the call continues.

Figure 8:
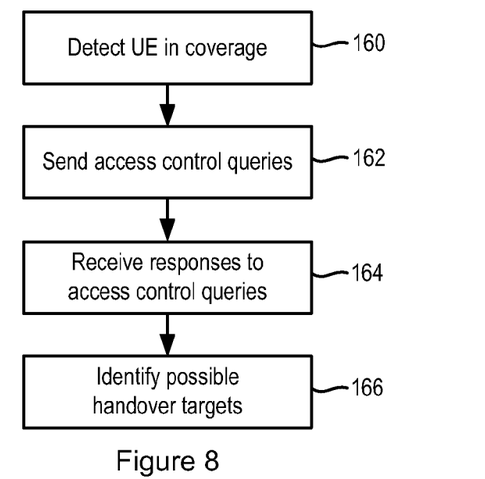
FIG. 8 is a flow chart, illustrating a third method performed in a femtocell access point in accordance with an aspect of the present invention.

FIG. 8 shows a further process for selecting suitable handover targets for a particular UE.

In step 160, a UE enters the coverage area of the femtocell basestation. The UE might be in a call, or it might not. In step 162, the femtocell performs an access control query to one femtocell in each of the groups in the association. That is, the femtocell sends a message to that basestation, asking to be informed whether or not the UE is allowed to access that basestation. As noted previously, the femtocells in a group have a common whitelist, or ACL, and so the access control query need only be sent to one femtocell in each group, and it does not matter which femtocell is selected from each group.

In step 164, the femtocell basestation receives responses to the access control queries from the selected femtocells. Each of these responses indicates whether the UE is authorised to access the respective selected femtocell. By extension, the femtocell basestation is able to deduce whether the UE is authorised to access the other femtocells in the same group as that selected femtocell, because the femtocells in a group have a common whitelist, or ACL.

In step 166, the femtocell basestation combines the information from the responses to the access control queries, in order to identify which femtocells that UE is authorised to access. Thus, the femtocell basestation can ensure that it only instructs handover attempts to femtocells on which the UE is authorised.

Thus, the overhead associated with failed handover attempts is reduced.

While a system has been described herein, in which there can be multiple associations of femtocells in the network, with associations being subdivided into groups, in general the network can be divided into three or more tiers of identities. For example, a network may be divided into multiple "tier 1 identities" (e.g. associations), each of which may be sub-divided into multiple "tier 2 identities", with each of these being sub-divided in turn into multiple "tier 3 identities". In that case, the group identities, as described above, might refer to the tier 2 identities or to the tier 3 identities, depending on the organization of the network of femtocells.

There is thus described a system in which the probability of a failed handover can be reduced, because the serving base station has obtained additional information about the possible handover targets on which a specific UE might be authorised.

The invention claimed is:

1. A method of operation of a base station in a telecommunications network, the method comprising, in the base station:

for a user device served by the base station, identifying group identities of other groups of base stations in the network that the user device is authorised to access;

identifying, for each of a plurality of possible neighbour cell base stations in the network, a group identity for a group that each of the plurality of possible neighbour cell base stations in the network belongs to; and identifying at least one possible handover target cell base station for the user device served by the base station, based on the identified group identities of other groups of base stations in the network that the user device is authorised to access, and based on the identified group identity for each of a plurality of possible neighbour cell base stations in the network.

2. A method as claimed in claim 1, comprising:

detecting information transmitted by other base stations in the network, said information transmitted by the other base stations in the network indicating which user devices are authorised to access said other base stations.

3. A method as claimed in claim 1, wherein the step of identifying which other base stations in the network that user device is authorised to access comprises:

requesting information from a core network node of the communications network.

4. A method as claimed in claim 1, wherein the step of identifying which other base stations in the network that user device is authorised to access comprises: requesting that information from the user device.

5. A method as claimed in claim 1, wherein the step of identifying a group identity for each of a plurality of possible neighbour cell base stations in the network comprises detecting transmissions from a plurality of other base stations in the network.

6. A method as claimed in claim 1, further comprising:

on determining that a handover of a user device is required, initiating a handover to a base station previously identified as a possible handover target cell base station for said user device.

7. A computer program product, comprising a non-transitory computer readable medium and computer readable code stored in the non-transitory computer readable medium, the computer readable code suitable for causing a device to operate in accordance with a method as claimed in claim 1.

8. A computer program product as claimed in claim 7, further comprising:

code for detecting information transmitted by other base stations in the network, said information transmitted by the other base stations in the network indicating which user devices are authorised to access said other base stations.

9. A computer program product as claimed in claim 7, wherein code for identifying which other base stations in the network that user device is authorised to access comprises:

code for requesting information from a core network node of the communications network.

10. A computer program product as claimed in claim 7, wherein code for identifying which other base stations in the network that user device is authorised to access comprises:

code for requesting that information from the user device.

11. A computer program product as claimed in claim 7, wherein code for identifying a group identity for each of a plurality of possible neighbour cell base stations in the network comprises code for detecting transmissions from a plurality of other base stations in the network.

12. A computer program product as claimed in claim 7, further comprising:

code for initiating, on determining that a handover of a user device is required, a handover to a base station previously identified as a possible handover target cell base station for said user device.

13. A base station, for use in a cellular communications network, the base station being adapted to operate in accordance with a method as claimed in claim 1.

14. A base station as claimed in claim 13, further adapted for detecting information transmitted by other base stations in the network, said information transmitted by the other base stations in the network indicating which user devices are authorised to access said other base stations.

15. A base station as claimed in claim 13,
further adapted for requesting information from a core network node of the communications network when identifying which other base stations in the network that user device is authorised to access.

16. A base station as claimed in claim 13, further adapted for requesting information from the user device when identifying which other base stations in the network that user device is authorised to access.

17. A base station as claimed in claim 13, further adapted for detecting transmissions from a plurality of other base stations in the network when identifying a group identity for each of a plurality of possible neighbour cell base stations in the network.

18. A base station as claimed in claim 13, further comprising:
code for initiating, on determining that a handover of a user device is required, a handover to a base station previously identified as a possible handover target cell base station for said user device.

* * * * *